K. D. SMITH.
VACUUM TANK.
APPLICATION FILED NOV. 9, 1916.
1,254,165.
Patented Jan. 22, 1918.
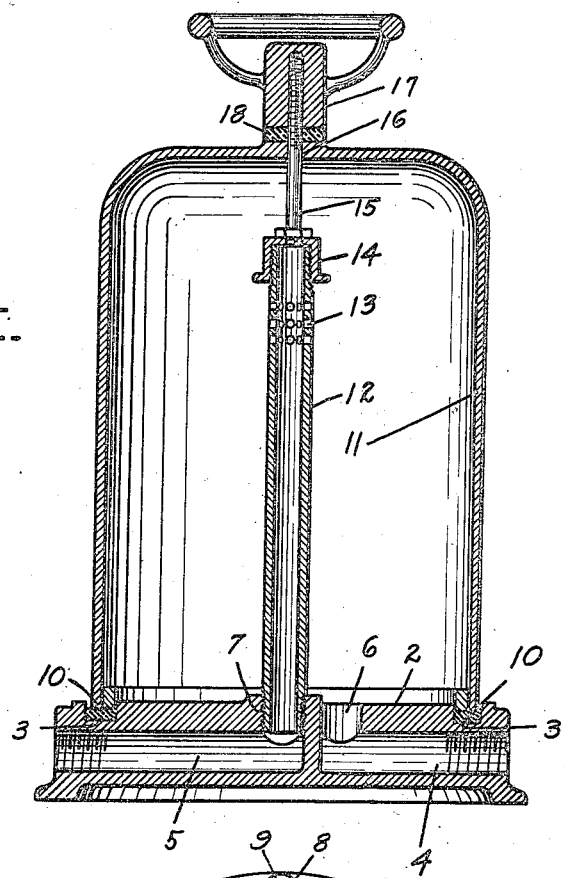
FIG. I.
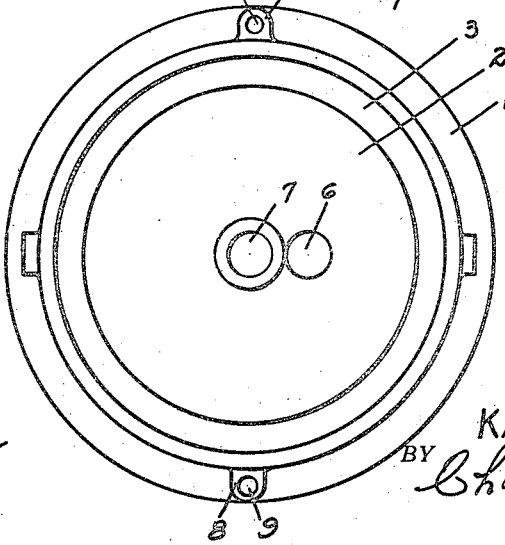
FIG. II.
WITNESSES:
INVENTOR.
KARL D. SMITH.
BY
ATTORNEYS.

UNITED STATES PATENT OFFICE.

KARL D. SMITH, OF BATTLE CREEK, MICHIGAN.

VACUUM-TANK.

1,254,165.

Specification of Letters Patent. Patented Jan. 22, 1918.

Application filed November 9, 1916. Serial No. 130,497.

*To all whom it may concern:*

Be it known that I, KARL D. SMITH, a citizen of the United States, residing at Battle Creek, county of Calhoun, State of Michigan, have invented certain new and useful Improvements in Vacuum-Tanks, of which the following is a specification.

This invention relates to improvements in vacuum tanks.

It has been found in practice that in the use of vacuum tanks for milking machines the tanks quickly become unsanitary owing to the condensation of the milk vapors in the tanks and my improved vacuum tank is especially designed by me for use in milking machines, and I have illustrated my improvements as I have embodied them for that purpose, although they are capable of embodiment and are desirable for use in vacuum tanks designed for use in other relations.

The main object of this invention is to provide a vacuum tank which may be readily disassembled to permit cleaning and one in which the parts are so formed and arranged that when disassembled they may be readily cleansed.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a vertical central section of my improved vacuum tank.

Fig. II is a plan view of the base.

In the drawing similar reference characters refer to similar parts throughout both views.

Referring to the drawing, the base 1 is provided with a flat face 2 having an annular gasket seat 3 therein. The base is provided with an inlet passage 4 and a discharge passage 5 threaded at their outer ends to receive suitable connections. These passages open into the face of the base at 6 and 7 respectively, the opening 7 being disposed centrally of the base and of the annular gasket seat 3. The base is provided with bosses 8 at opposite sides having holes 9 therein adapted to receive bolts for securing the base to its support or foundation.

A gasket 10 is arranged in the seat 3. The tank body 11 is inverted upon the base with its lower edges resting on this gasket. The pipe 12 is threaded into the passage opening 7 and projects upwardly into the tank, thus forming a trap preventing moisture or foreign matter from pipe lines being drawn into the vacuum pump. The pipe has a series of openings 13 at its upper end.

On the upper end of the pipe is a cap 14 which carries a clamping rod extension 15. This extension is arranged through an opening 16 in the top of the tank body and is threaded to receive the clamping nut 17. A gasket 18 is provided for this clamping rod.

With the parts thus arranged they may be quickly assembled and disassembled and when disassembled are all accessible for cleaning. The base may be left mounted in position and the connections thereto undisturbed, or when necessary the connections may be readily removed for purposes of cleansing. The tank body when removed from the base is conveniently handled for cleaning. The parts also have the advantage of being simple and economical to produce.

Having thus described my invention, what I claim as new and desire to secure by Letters Patent, is:

1. In a vacuum tank, the combination of a base having passages opening in its face, a pipe threaded into one of said passage openings and having perforations at its upper end, a detachable cap for said pipe having an upwardly projecting rod thereon, a body inverted on said base having a hole in its upper end through which said rod projects, and a nut threaded upon said rod for clamping said body upon said base.

2. In a vacuum tank, the combination of a base having inlet and discharge passages, each comprising communicating horizontal and vertical bores, the free end of the former opening through the periphery of said base and the free end of the latter opening through the face of said base.

In witness whereof, I have hereunto set my hand and seal in the presence of two witnesses.

KARL D. SMITH. [L. S.]

Witnesses:
E. M. SMITH,
J. F. HAGELSHAW.

Copies of this patent may be obtained for five cents each, by addressing the "Commissioner of Patents, Washington, D. C."